(12) United States Patent
Cave

(10) Patent No.: US 9,787,872 B2
(45) Date of Patent: *Oct. 10, 2017

(54) COMPUTER PROGRAMS AND METHODS FOR GENERATING 1-BIT IMAGE DATA FROM MULTIPLE-BIT IMAGE DATA

(71) Applicant: Andrew William Peter Cave, Oakington (GB)

(72) Inventor: Andrew William Peter Cave, Oakington (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,446

(22) Filed: Oct. 26, 2016

(65) Prior Publication Data
US 2017/0048418 A1 Feb. 16, 2017

Related U.S. Application Data

(63) Continuation of application No. 13/898,676, filed on May 21, 2013, now Pat. No. 9,508,031.

(60) Provisional application No. 61/650,270, filed on May 22, 2012.

(51) Int. Cl.
*H04N 1/405* (2006.01)
*G06K 15/02* (2006.01)
*H04N 1/52* (2006.01)
*H04N 1/60* (2006.01)

(52) U.S. Cl.
CPC ....... *H04N 1/4053* (2013.01); *G06K 15/1878* (2013.01); *H04N 1/52* (2013.01); *H04N 1/6008* (2013.01); *H04N 1/6058* (2013.01)

(58) Field of Classification Search
None
See application file for complete search history.

(56) References Cited

U.S. PATENT DOCUMENTS

| | | |
|---|---|---|
| 6,226,103 B1 | 5/2001 | Klassen et al. |
| 2004/0170314 A1 | 9/2004 | Harris et al. |
| 2005/0243340 A1 | 11/2005 | Tai et al. |
| 2007/0127076 A1 | 6/2007 | Cave |
| 2008/0137113 A1 | 6/2008 | Saito |
| 2009/0033956 A1 | 2/2009 | Tamagawa |
| 2012/0218607 A1 | 8/2012 | Cave |

FOREIGN PATENT DOCUMENTS

WO  WO 2011/030101  3/2011

*Primary Examiner* — Richa Mishra
(74) *Attorney, Agent, or Firm* — Dascenzo Intellectual Property Law, P.C.

(57) ABSTRACT

Methods of printing a color image having more than one color comprise receiving multiple-bit image data comprising multiple-bit pixel values, deriving 1-bit image data comprising first and second sets of 1-bit image data, and printing from the 1-bit image data the color image. Methods of generating 1-bit image data for a color image having more than one color comprise receiving multiple-bit image data comprising multiple-bit pixel values, and electronically deriving a first set and a second set of 1-bit image data.

20 Claims, 6 Drawing Sheets

Fig. 8

*Device 200*

Block 210:
| 127 | 130 | 134 | 138 |
| 130 | 128 | 130 | 138 |
| 134 | 130 | 138 | 138 |
| 138 | 134 | 138 | 140 |

Block 212:
| 138 | 139 | 140 | 141 |
| 140 | 139 | 141 | 142 |
| 140 | 140 | 142 | 144 |
| 140 | 140 | 142 | 143 |

Block 214:
| 140 | 138 | 136 | 134 |
| 141 | 139 | 137 | 135 |
| 142 | 139 | 136 | 132 |
| 142 | 140 | 136 | 133 |

Block 220:
| 138 | 133 | 138 | 138 |
| 138 | 133 | 138 | 140 |
| 138 | 137 | 138 | 139 |
| 134 | 133 | 135 | 136 |

Block 218:
| 150 | 145 | 143 | 144 |
| 145 | 145 | 144 | 146 |
| 140 | 140 | 142 | 145 |
| 138 | 139 | 140 | 142 |

Block 216:
| 143 | 141 | 139 | 136 |
| 145 | 142 | 140 | 137 |
| 143 | 140 | 138 | 135 |
| 140 | 138 | 135 | 133 |

Block 222:
| 130 | 127 | 130 | 133 |
| 127 | 127 | 128 | 130 |
| 126 | 125 | 127 | 128 |
| 125 | 124 | 123 | 127 |

Block 224:
| 135 | 137 | 139 | 140 |
| 128 | 132 | 135 | 137 |
| 128 | 129 | 132 | 134 |
| 127 | 127 | 129 | 132 |

Block 226:
| 140 | 137 | 132 | 130 |
| 137 | 134 | 133 | 128 |
| 135 | 133 | 127 | 126 |
| 133 | 130 | 122 | 120 |

COMPUTER PROGRAMS AND METHODS FOR GENERATING 1-BIT IMAGE DATA FROM MULTIPLE-BIT IMAGE DATA

RELATED APPLICATIONS

The present application is a continuation of, and claims priority under 35 U.S.C. §120 to, U.S. patent application Ser. No. 13/898,676, which was filed on May 21, 2013, issued on Nov. 29, 2016 as U.S. Pat. No. 9,508,031, and which claims priority to U.S. Provisional Patent Application No. 61/650,270, which was filed on May 22, 2012. The complete disclosures of the above-identified patent and patent application are incorporated herein by reference.

FIELD

The present disclosure relates to computer programs and methods for generating 1-bit image data from multiple-bit image data.

BACKGROUND

It is well-known to convert multiple-bit image data into 1-bit image data comprising "on" and "off" pixel values to enable an image having varying intensity levels to be printed so that the printed image is constituted by a plurality of dots, the number density or size of which varies in order to represent the varying intensity levels.

Such programs fall into two broad categories. The first category carries out so-called "amplitude modulated" (AM) screening to generate 1-bit image data that, when printed, produce an image that is constituted by a plurality of sizes of dots regularly arranged throughout the image. The second category of programs carries out so-called "frequency modulated" (FM) screening to generate 1-bit image data that, when printed, produce an image that is constituted by a plurality of number densities of dots, substantially all of the dots typically having the same size.

FM screening is widely considered to provide the potential for higher quality image reproduction than AM screening, but has not been widely adopted. One of the issues affecting FM (also known as stochastic) screening has been the graininess (noise and patterning) of the printed result. Various proposals have been made to reduce or eliminate noise in FM screened images, but these techniques have only been developed in relation to monochrome printing. The techniques do not eliminate noise that can arise in FM colour images or colour errors which can occur (especially at mid intensity levels) as a result of mis-registration of the arrays of different coloured dots laid down in the printing process.

SUMMARY

Methods of printing colour images, methods of generating 1-bit image data for colour images, printing apparatus, and electronic data processing apparatus are disclosed.

Methods of printing colour images having more than one colour and derived from multiple bit image data comprise the steps of (a) receiving multiple-bit image data comprising multiple-bit pixel values; (b) deriving from said multiple-bit pixel values 1-bit image data comprising a first set and a second set of 1-bit image data comprising "on" and "off" pixel values, each set corresponding to a respective component colour of the colour image; and (c) printing from the 1-bit image data the colour image comprising corresponding first and second sets of dots. Methods of generating 1-bit image data for colour images having more than one colour comprise the steps of: (a) receiving multiple-bit image data comprising multiple-bit pixel values; and (b) using electronic data processing apparatus, electronically deriving from said multiple-bit pixel values a first set and a second set of 1-bit image data comprising "on" and "off" pixel values which produce when printed a first and second set of dots.

In such methods, the dots of each set are of a respective one of the component colours. Each of all of the dots of one of the colours of dots are constrained to be within a respective site selected from a first set of predetermined possible sites. Each of all of the dots of the other colour of dots are constrained to be within a respective site selected from a second set of predetermined possible sites. The possible sites of the first and second sets of possible sites overlap so that individual dots of one colour of dots can overlap dots of the other colour of dots. The possible sites of one set are of different dimensions from the sites of the other set so that individual dots of one colour cannot fully cover individual dots of the other colour. The possible sites have the same shape and size but different dimensions by virtue of the sites of the first set of possible sites having a different orientation from the sites of the second set of possible sites.

BRIEF DESCRIPTION OF THE DRAWINGS

FIG. 8 is a schematic representation of a portion of an array of 8-bit pixel values that constitute multiple-bit image data.

DESCRIPTION

Figure 1A:
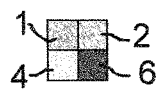
FIGS. 1A and 1B illustrate two possible ways in which dots may be deposited in a printing process using FM screening to determine the position of printed dots of four component colours (in the CMYK printing system) on a substrate.

The present disclosure relates to computer programs and methods for generating 1-bit image data from multiple-bit image data. In some embodiments, computer programs and methods for generating 1-bit image data that, when printed, produces a colour image constituted by dots. The present disclosure also relates to methods for printing colour images derived from multiple-bit image data, and to printing apparatuses for printing such images.

According to a first aspect of the present disclosure, there is provided a computer program for executing on a computer system a computer process for generating 1-bit image data for a colour image, the 1-bit image data comprising at least two sets of pixel values, each set corresponding to a respective component colour of the image. The computer process may include the steps of (a) receiving multiple-bit image data comprising multiple-bit pixel values; and (b) deriving from said multiple-bit pixel values a first and second set of 1-bit image data comprising "on" and "off" pixel values. The 1-bit image data may produce, when printed, an image comprising corresponding first and second sets of dots, the dots of each set being of a respective one of the component colours. Each dot of one of the sets of dots may be contained within a respective site selected from a first set of possible sites, and each dot of the other set of dots may be contained within a respective site selected from a second set of possible sites. The sites of the first and second sets of possible sites may overlap so that individual dots from one set of dots can overlap dots from the other set of dots. The sites of one set are of different dimensions from the sites of the other set, so that individual dots from one set cannot fully cover individual dots from the other set.

In some embodiments, each set of possible sites is tessellated, and the two sets of possible sites cover the same area of the image. The possible sites may be of different dimensions by virtue of having different sizes, shapes or orientations.

In some embodiments, the possible sites from one set are each of a size of M1×N1 pixels, whilst those of the second set are of a size M2×N2 pixels, where M1 does not equal M2 and N1 does not equal N2. Thus, for example, the dimensions of each member of one set of possible sites could be two units high by three units wide (2×3), whilst those of each possible site from the other set would be three units high by two units wide (3×2). Each such unit may correspond to a respective pixel in the output image so that the sites of the first set of possible sites are each defined by two rows and three columns of pixels, the second set of possible sites each being defined by three rows and two columns of pixels. The possible sites could thus be considered to have the same shape (i.e. rectangular) and size (six pixels) but have different orientations, one rectangle being angularly displaced by 90° relative to the other.

Each dot may be co-extensive with its respective site, so that the dot has the same size, shape and orientation as its respective site. Alternatively, the sites may not be fully populated, so that each dot is smaller than its respective site. This can result in the dots of the two sets being of the same size, shape and orientation, but since each dot of a given set is constrained to be within its respective site, the dots can be so arranged (for example with all the dots of one set being in the same position in their corresponding sites) so that a significant number of individual dots from one set still cannot completely cover dots from the other set.

In known FM screening techniques, for colour images, the dots for each set would share the same possible sites, so that a dot from one set could completely cover a dot from the other set or in other cases dots from one set could be interleaved between those from the other set. Due to the way in which ink filters light, a zone which has a large proportion of dots covered by other dots will appear lighter than a zone which has the same number of dots, but has a greater proportion of interleaved dots. By ensuring that the number of instances of dots from one set completely covering those from another set is at least reduced, some methods according to the present disclosure ameliorate or avoid the problems caused by the aforesaid variations.

Since many dots will only partially overlap, the effect of mis-registration on colour is also reduced. This is especially pertinent if an FM screening technique is being used to render an area in a tone constituted by the two colours when at their mid intensity levels. Although there is a random element to the way in which the standard algorithms lay down dots, the error diffusion algorithms which are also used result in dots for an area of mid tone being presented in a chequer-board pattern. Since this can happen for both colour components, the conventional techniques can result in all of the dots from one set being completely covered by registering dots from the other set. However, any mis-registration will cause a very noticeable colour error because the coloured inks filter light much less effectively when the dots are completely in register. However, if dots are laid down in accordance with a program or method of the present disclosure, then the normal relationship between the dots of different sets will be one in which very few dots are fully covered by dots of the other set, so that any mis-registration will have a less, or no, noticeable effect on colour.

A particular problem that may arise with printing processes that utilise FM screening is patterning which can result from isolated pairs of diagonally adjacent dots exhibiting greater dot gain than isolated pairs of horizontally or vertically adjacent dots. This is discussed in PCT International Publication No. WO 2011/030101 and U.S. Patent Application Publication No. 2012/0218607 (the disclosures of which are hereby incorporated by reference), in which the problem is at least ameliorated by reducing the size of each dot in the output data, so that each dot is no longer co-extensive with its site. However, the dot is still the only dot allocated to that particular site so that spacing between adjacent dots can be ensured. The reduction in size can be done by omitting the first row and/or column of the pixels defining each dot.

It will be appreciated that, in the present case, this reduction may lead to the dots of the two sets being of the same dimensions as each other, as mentioned above. For example, omitting the first column of a 2×3 pixel dot and the first row of a 3×2 pixel dot will produce two 2×2 pixel dots.

If the placement of such dots were unconstrained, then it is possible for a significant number of dots of one set to be completely covered by (and co-extensive with) the dots of the other set. However, significant amounts of covering can be avoided since each dot is constrained to remain in its site, and the reduced size dots of each set can occupy corresponding portions of their sites.

Thus, where the size of the dots is reduced so that the dots of both sets are the same size, this may be done in a consistent manner for the dots in each set, so that the dots in each set all occupy the same respective portion of their sites. For example, if the 3×2 and 2×3 dots are being reduced in size, this preferably involves omitting the first row of all of the 3×2 dots and the first column of all of the 2×3 dots.

It is then possible for some dots to be completely covered by others, but this will only apply to a minority of dots, and at regular intervals which occur over the output medium with a high frequency of repetition, and is generally imperceptible to the eye. In the example mentioned above, a 2×2 dot for one set can be covered completely by a 2×2 dot for the other set only in one corner of an image cell, the cell being the smallest area that can accommodate an integral number of possible sites from each set (for example a cell of 6×6 pixels for 2×3 and 3×2 pixel possible sites). In some embodiments, the width of each site in any one of the sets may not be a multiple or a factor of the width of each site in the other set. Thus, the sites are not in phase with each other so that one possible site cannot be sandwiched (i.e. interleaved) between two adjacent possible sites from the other set. Consequently, a dot from one set can only ever be concatenated with one non-overlapping dot from the other set. When the intensity to be represented by the dots is around 50% of maximum, this avoids setting up a series of interleaved, concatenated dots from alternating sets, and thus avoids the consequent patterning which may occur in the final image.

In some embodiments, the pixel data for one of the sets of dots associated with possible sites of 2×3 in size or the dots associated with possible sites of 3×2 units in size is for the cyan component of the image, whilst that for the other set is for the magenta component.

In some embodiments, the image data may include data for a third set of dots, and associated possible sites, corresponding to the black component, the size of each site of the set being 4×4 pixels. The reduced size version of these dots may be 3×4 or 4×3 pixels.

According to a second aspect of the disclosure, there is provided a printing apparatus comprising a printer, and a computer programmed with, and operable to execute, a program in accordance with the first aspect of the present disclosure. The computer may generate a plurality of sets of 1-bit image data comprising "on" and "off" pixel values, each of which corresponds to a pixel of an output medium that the printer would attempt to mark, in the colour associated with that pixel's set when printing the 1-bit data if the pixel were on.

Also within the scope of the present disclosure is a method of printing a colour image derived from multiple bit image data. The method may include (a) converting the multiple bit image data into 1-bit image data comprising two sets of "on" and "off" pixel values, each set corresponding to a respective component colour of the image, and (b) printing the two sets of data onto an output medium to create two sets of dots, each of which dots is located at a respective site, each of a respective component colour, at positions which may overlap. The sites for the dots of one set are of different dimensions from those of the other set, so that the dots may be arranged such that individual dots from one set cannot completely cover, or be completely covered by, individual dots from the other set.

Where appropriate, the various methods disclosed herein may be described as computer-implemented methods, server-implemented methods, and/or printer-implemented methods. Moreover, such computer, servers, and/or printers may be configured to utilize, implement, and/or otherwise facilitate various methods according to the present disclosure. Computers, servers, and/or printers may include or be configured to read computer readable storage, or memory, media suitable for storing computer-executable instructions, or software, for implementing methods or steps of methods according to the present disclosure. Examples of such media include CD-ROMs, disks, hard drives, flash memory, solid state memory, etc. As used herein, storage, or memory, devices and media having computer-executable instructions, as well as the various methods disclosed herein, are considered to be within the scope of subject matter deemed patentable in accordance with Section 101 of Title 35 of the United States Code.

Figure 1B:
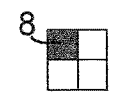

FIGS. 1A and 1B show two possible outcomes of printing four colour ink dots (of cyan, magenta, yellow and black) on a small portion of an output medium, which an FM screening process has determined should be marked with all four dots.

Typically, an FM screening process adds a random factor to the selection of the site for at least one of the dots to be printed in each colour, so that the same intensity of colour components for an image can be represented by differing distributions of dots, any of which distributions achieves the number density of dots to present the required intensity to the eye.

In scenario A, corresponding to FIG. 1A, the dots have been randomly placed so that the cyan dot 1, the magenta dot 2, the yellow dot 4 and the black, key dot 6 all fall adjacent to each other so as to define a 2×2 block of concatenated dots. In scenario B, corresponding to FIG. 1B, all four dots have been randomly placed on the same grid so that they all fall on top of each other to form a composite dot 8. Although the composite dot 8 is darker than the dots 1, 2, 4 and 6, it will filter less light than the four adjacent dots, due to the way in which ink filters light. Consequently, the four dots in scenario A will appear darker than the four dots forming the composite dot 8 of scenario B, despite the fact that the same total amount of ink has been applied in each scenario. It is this random intersection, or not, of dots which is one of the causes of noise when using more than one colour with FM screening techniques.

Figure 2:
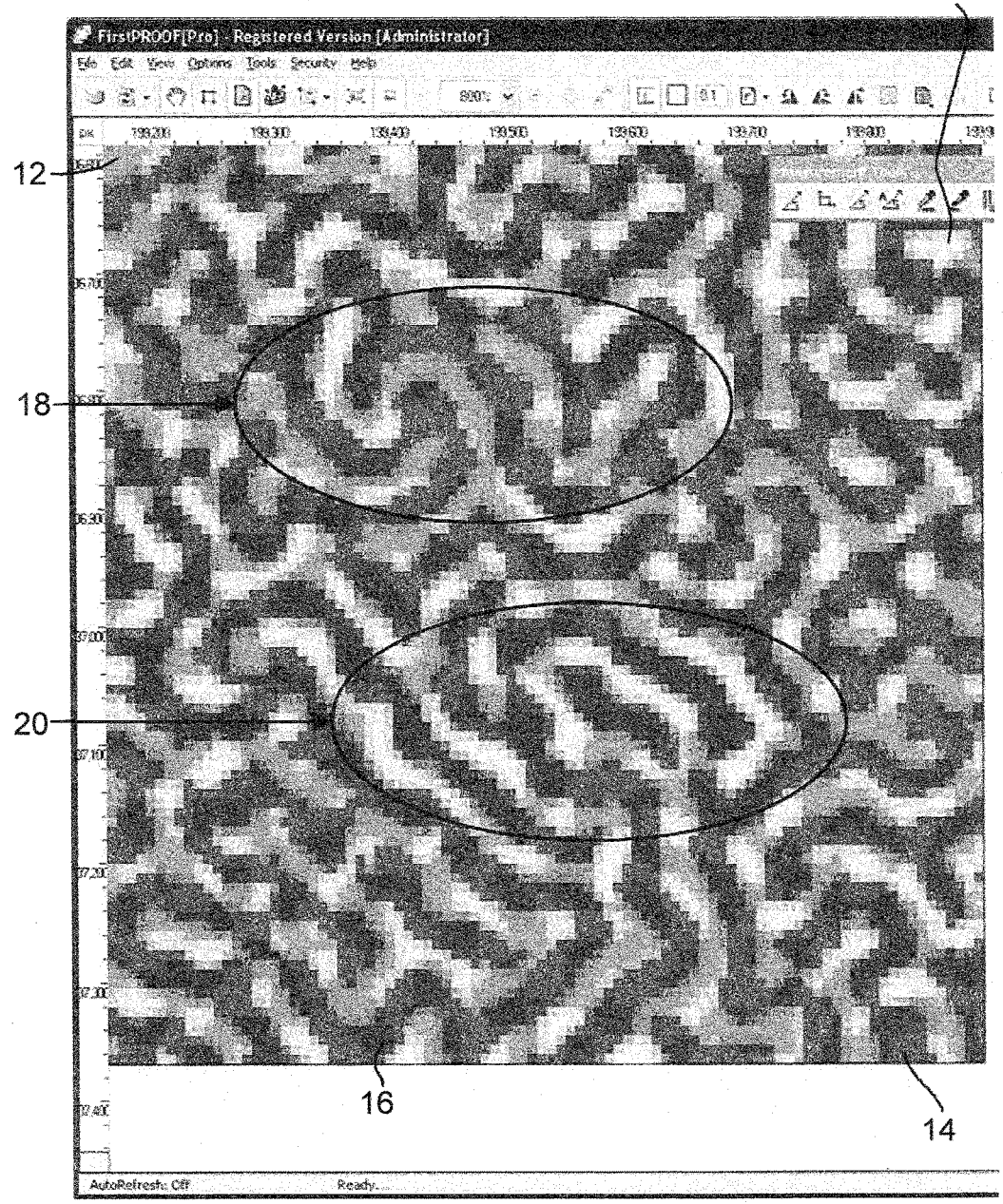
FIG. 2 is a screen capture of a mix of colours obtained by an FM screening process (when applied to two colour components), illustrating resultant variations in perceived intensity.

FIG. 2 shows a screen capture of a very small part of an image constituted by cyan and magenta component colours, applied as dots using an FM screening process. The areas shown in the Figure use a respective shade of grey to indicate each of the areas where there is no overlap between any dots, for example as shown at 10, magenta dots, for example denoted by 12, cyan dots, for example as shown at 14, and overlapping cyan and magenta dots which are indicated by the darkest shade of grey, for example as shown at 16. Although very similar shades are used for the cyan dots and the overlapping regions, the Figure does clearly show that inconsistencies in the extent to which the dots overlap can lead to dark areas, such as the area 18, in which a high proportion of the dots are interleaved, and light areas, such as the area 20, in which a larger proportion of the dots overlap each other. In this example, the variation is caused by the two dot structures having the same "frequency" and "size", in this case the same "swirl frequency" and "swirl width".

Figure 3:
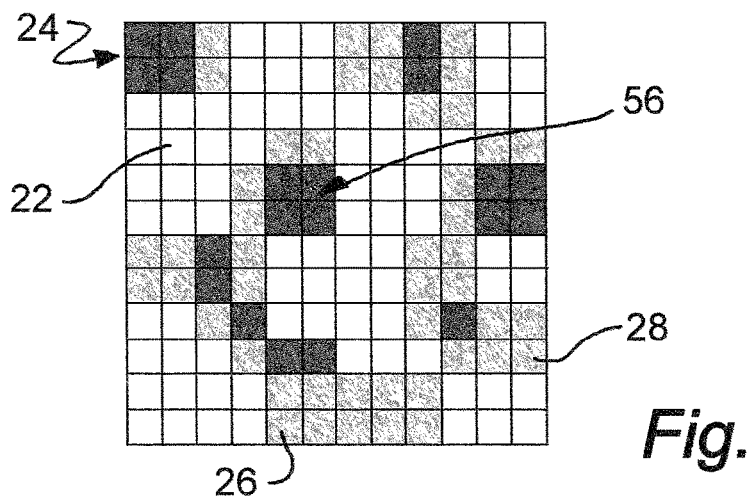
FIG. 3 shows a grid forming a small part of an output image created by a process in accordance with the present disclosure, the image in this example being constituted by two component colours, magenta and cyan.

FIG. 3 illustrates how cyan and magenta dots can be laid down by a technique within the scope of the present disclosure. The dots are shown placed on a grid of 12×12 pixels, each corresponding to a respective pixel in an output medium. In the Figure, the white pixels are pixels on which no drop has been deposited, pixels to which just magenta or cyan ink has been applied are shown in the same shade of grey, whilst pixels to which both inks have been applied are shown as a darker shade of grey. Thus, for example, no ink has been applied to the pixel 22, whereas the 2×2 block of pixels 24 have had both types of ink applied, the pixel 26 is magenta and reference numeral 28 denotes a cyan pixel.

Each magenta pixel is part of a respective magenta dot constituted by a block of three rows and two columns of pixels, whilst each cyan pixel is part of a dot constituted by two rows and three columns of neighbouring pixels. Each dot lies in a respective, correspondingly sized site of possible pixel positions for that dot, each site only ever accommodating the pixels from one associated colour of dot, although dots of the other colour can encroach on an occupied site.

Figure 4:
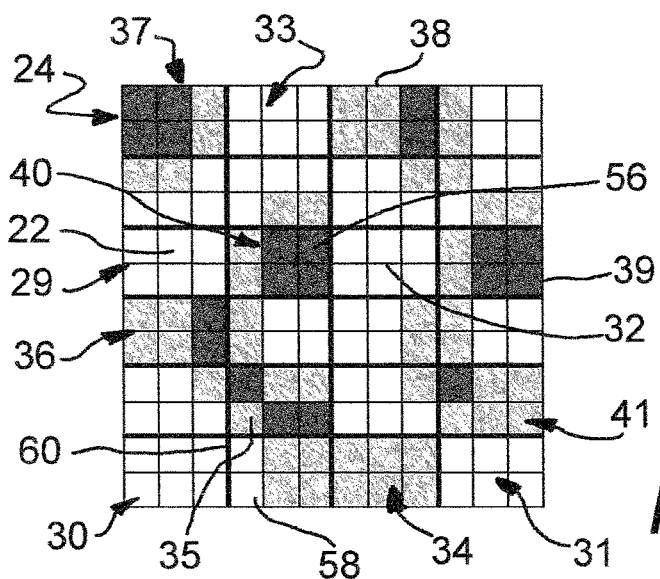
FIG. 4 is a corresponding view of the grid of FIG. 3, marked-up to show the possible sites for the cyan dots.

In FIG. 4, thicker lines have been used to denote the arrangement of possible sites for the cyan dots. Those possible sites form a 6×4 array that tiles the grid area shown in FIG. 3, each site in the array being of two rows and three columns of pixels (i.e. of a size corresponding to that of the cyan dots). In this particular example, some of the sites, 29-33 contain no marked pixels at all, whilst eight sites, 34-41, contain cyan dots. Each of the sites 34-41, however, can only contain pixels from a respective one of the cyan dots.

Figure 5:
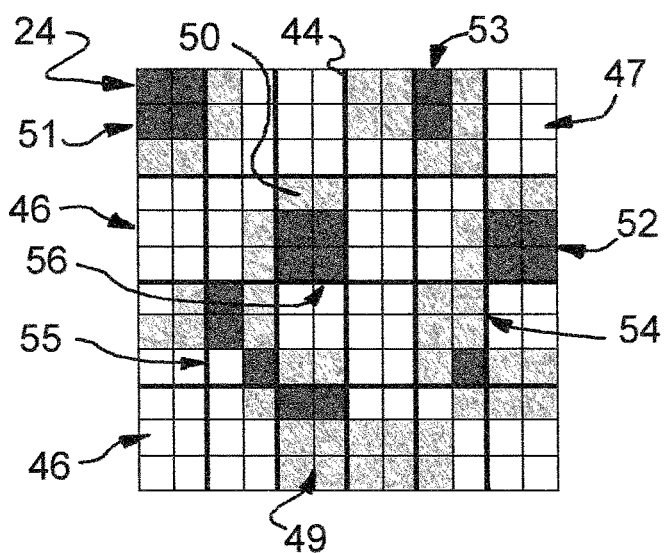
FIG. 5 is a corresponding view of the grid of FIG. 3, marked-up to highlight the possible sites for the magenta dots.

In FIG. 5, the thicker black lines (for example line 44) highlight a grid of possible sites for the magenta dots. As can be seen from the Figure, each possible site is of a corresponding size to a magenta dot (i.e. three rows by two columns of pixels), and the possible sites for the magenta dots tile the area in an array of four rows by six columns. Some of the possible sites, for example 46-48, contain no pixels of either colour, whilst the magenta dots are situated at sites 49-55.

The allowable locations for the dots of each colour are constrained by the possible sites for that colour of dot. Thus each cyan dot can only be placed in a single respective site for the cyan dots, whilst each magenta dot must lie in a single respective possible site for the magenta dots. This means that a dot cannot overlap a number of possible sites for dots of that colour, and that a dot cannot encroach upon a site for dots of that colour which is already occupied by another dot of the same colour. However, a possible site for dots of one colour does overlap at least two possible sites for dots of the other colour. Consequently, although there is no overlap of dots of the same colour, dots of different colour can, and frequently do, overlap. This is the case with the sites 37 and 51 which gave rise to the overlapping block 24. Similarly, sites 40 and 50 overlap and, since those sites are occupied, also accommodate a 2×2 block 56 of pixels formed by overlapping magenta and cyan dots.

Although a dot of one colour can encroach on a dot of another colour, a magenta and cyan dot cannot completely cover each other because of their differing dimensions. Furthermore, the constraints placed on the positions of the dots by the possible sites are such that any opportunities for a dot of one colour to abut an adjacent dot of the other colour are limited. Thus, although the magenta dot at site 49 abuts the adjacent cyan dot at site 34, the next available site, site 30, for a cyan dot is spaced from the open side of the magenta dot by a column of two pixels (58 and 60 in FIG. 4). This arises from the fact that the spacings between the possible sites for the different colours of dot cannot be in phase with each other since the length/height of either possible site is not a multiple of the length/height of the other type of possible site.

A single dot of one colour will be able randomly to overlap with one, two, three or four pixels of a dot of another colour (i.e. only a maximum of 66% of the other dot).

A screening process according to the present disclosure can thus achieve a more consistent extent of overlap/interleaving of dots of the different colours for given shades of output colour.

It will also be appreciated from FIGS. 3-5 that many overlapping portions of two dots span at least one of those dots. For example, the overlapping portion 56 spans the cyan dot in a possible site 40 from top to bottom. If there is any mis-registration in the application of the magenta or cyan dots which lowers the position of the magenta dot at site 50 relative to the cyan dot at site 40, this will reduce the amount of magenta dot protruding beyond the top of the cyan dot, but this will be countered by the area of the magenta dot which would then protrude beyond the bottom of the cyan dot.

A process according to the present disclosure thus increases the tolerance of the print to mis-registration of dots of different colours (which would otherwise cause colour drift or errors).

In the above example, any site at which a dot of the associated colour is located is fully populated by that dot, so that all of the pixels within the site are marked by the colour for that dot. Consequently, the magenta and cyan dots are the same dimensions as their respective sites, and each dot extends to the periphery of its respective site.

However, there are circumstances where it may be desirable to use a reduced size of dot (relative to the size of the site) to avoid dot gain, as discussed in WO 2011/030101. In the present case, this can be achieved by consistently reducing the size of the dots of each colour. For example, all the cyan dots can be reduced by omitting their first column of pixels (i.e. the two pixels on the left-hand side of each dot), whilst a corresponding reduction can be achieved by omitting the first row (i.e. the top two pixels) of each magenta dot.

Figure 6:
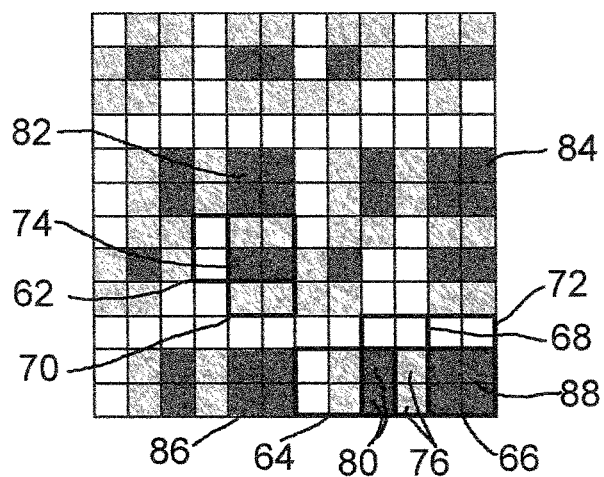
FIG. 6 is a corresponding view of the grid of FIG. 3, marked-up with reduced size dots.

This means that both types of dot will then be of a size of 2×2 pixels. However, the cyan dots will only occupy the right-hand two-thirds of their associated sites, whilst the magenta dots will only occupy the lower two-thirds of their associated sites. This situation is illustrated in FIG. 6, which is a grid similar to that shown in FIGS. 3-5, but in which the size of the dots has been reduced (and the locations of the dots differ from those of the dots shown in FIGS. 3-5). Although both colours of dots are now the same size, their sites are of the same dimension as before. This, coupled with the fact that the dots of each colour can only occupy the same part of the respective possible sites, means that most of the dots of one colour still cannot be completely covered by dots of the other colour.

As with FIGS. 3-5, the pixels which are marked with magenta or cyan ink only are represented by the same shade of grey, whilst the darker shade of grey represents pixels which have been marked with ink of both colours. In order to illustrate the relationship between the dots of different colours, three possible sites, 62, 64, 66 for the cyan dots are shown in FIG. 6, whilst reference numerals 68 and 70 denote two possible sites for the magenta dots. Each of the sites 62, 64, 66, 68 and 70 contains a respective one of the dots for the set associated with that site. Thus, the sites 62, 64 and 66 each contain a respective cyan dot of 2×2 pixels, whilst the sites 68 and 70 each contain a respective magenta dot, also of 2×2 pixels. The site 72 also accommodates a respective magenta dot.

The cyan dot in the site 62 only occupies the middle and right-hand column of pixels in that site, whilst the magenta dot in the site 70 only occupies the bottom and middle row of pixels of that site, so that the two dots cannot fully overlap, the two pixels 74 being the only area where overlap occurs. Similarly, the magenta dot in the possible site 68 only occupies the bottom two rows of that site, whilst the cyan dot in the site 66 only occupies the middle and right-hand columns of pixels of that site and the cyan dot in the site 64 similarly only occupies the middle and right-hand columns of that site. Thus the two pixels 76 are marked cyan ink only, and the two pixels 80 are marked with ink of both colours. The only areas in which a cyan dot can completely cover a magenta dot are in the bottom right-hand corner of each of an array of 6×6 pixel cells. The 2×2 pixel blocks to which this applies in FIG. 6 are indicated by reference numerals 82, 84, 86 and 88.

Figure 7:
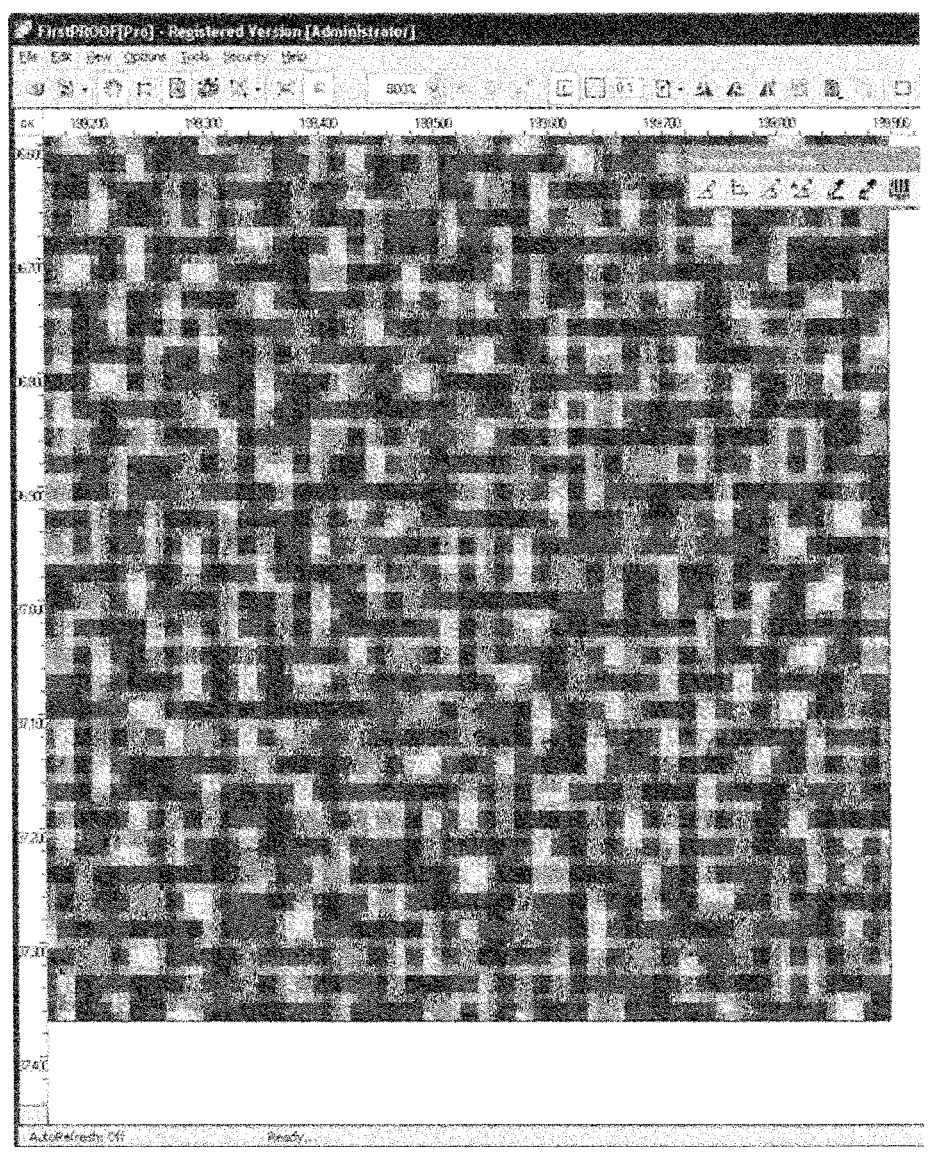
FIG. 7 is a screen capture corresponding to FIG. 2, illustrating how the process in accordance with the present disclosure achieves improvement in the consistency of the overlap between dots.

Each of those cells can be considered to be a stochastic rosette cell, and the repetition occurs at a high frequency that does not cause the eye any problems. FIG. 7 shows a large area to which the reduced sized dots have been applied. As can be seen, even with the reduced size dots, a far better consistency of overlap/interleaving for colour images is achieved than with the prior art screening method, which gives rise to the variations shown at 18 and 20 in FIG. 2.

The way in which the present screening process converts a multi-bit image input into a 1-bit output array for the dots mentioned above is similar to the known screening processes, although the different dimensions of the two different types of possible sites are taken into account in the initial scaling of the multi-bit input array.

FIG. 8 shows a portion 200 of a multiple-bit image data array which has been divided up into a number of subsets, 210-226. Each subset contains sixteen 8-bit pixel values each represented by a respective number. Each pixel value represents the desired intensity for a component colour of a corresponding pixel in the output image. Each element of the array may be a word of a sufficient number of bits to convey intensity information for all the component colours, or the multi-bit array may apply to just one of the component colours. In either case, the division of the individual values into subsets will correspond to the way in which the pixels are mapped onto the dot sites in the final image. Thus, for example, a portion of the input data array for a 2400 dpi image will have 2400 rows and 2400 columns of multiple-bit pixel values per square inch. If these values are for mapping onto cyan dots, those values will be allocated into 800×1200 subsets per square inch for cyan. If the values are for magenta dots, they will be allocated into 1200×800 subsets. If the values are for black intensity levels, they will then be mapped into 600×600 subsets per square inch (since the black possible sites are of 4×4 pixels).

To obtain the second array, the first intermediate array is processed using an error diffusion algorithm which is applied to each average pixel value (i.e. average value for each of the subsets of the input array) of the first intermediate array in turn, starting at the top left average pixel value, working along the first row of average pixel values to the top right average pixel value then proceeding to the right most average pixel value of the second row, and so on. For the first average pixel value, the algorithm will typically add a random number to randomise the selection of the first dot (i.e. 'on' value) on the second output array. The sum of the random number and the average is subjected to a threshold test. For example, that threshold may be 127 (about half of the 255 maximum value that an 8-bit word can represent). If the sum is greater than the threshold then the first entry in the output array is set to "on".

Figure 9:
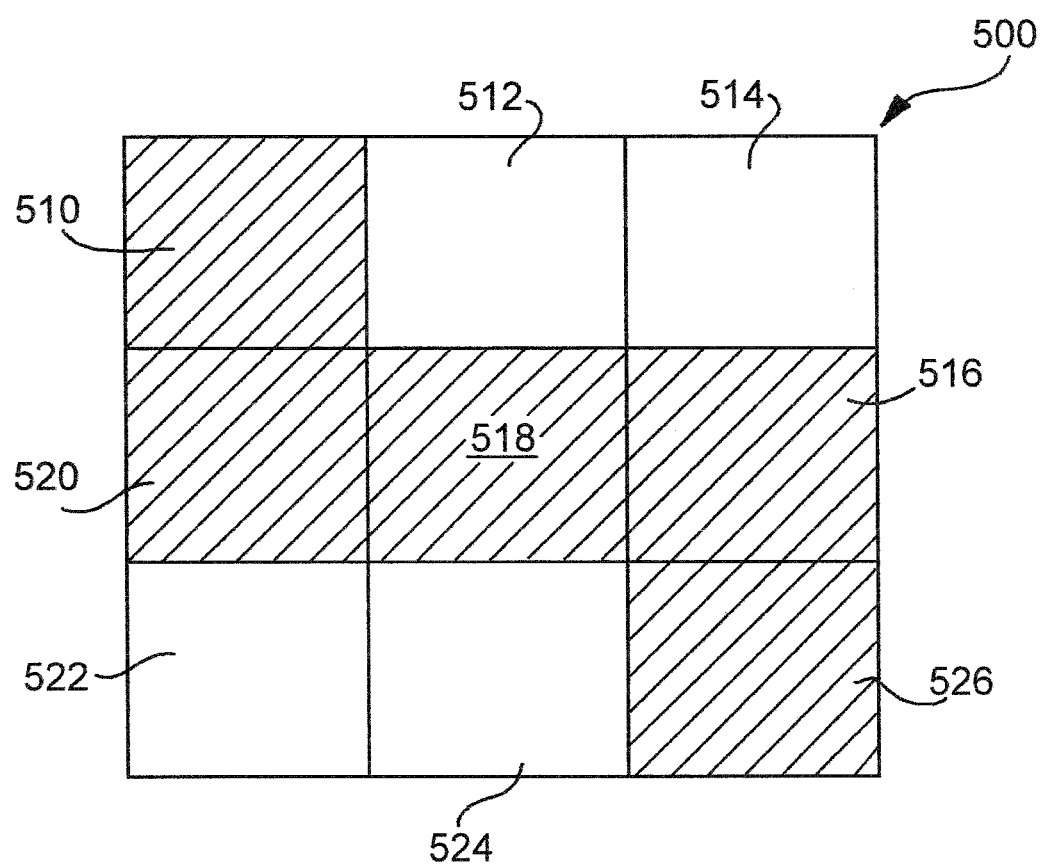
FIG. 9 is a schematic representation of a grid of possible sites for dots.

This is what has happened in the present example, as is indicated at 510 in FIG. 9.

For each average pixel value in turn, unless the corresponding pixel value of the second intermediate array has already been set to "on", the error diffusion algorithm determines from the average pixel value and any diffused error whether the corresponding pixel value of the second intermediate array should be set to "on". If it is determined that the corresponding pixel value should be set to "on", a first series of tests are applied based on the average pixel value. If the results of the tests are all negative, the corresponding pixel value is set to "on", otherwise the corresponding pixel value remains set to "off". Similarly, if it is determined by the error diffusion algorithm that the corresponding pixel value should be set to "off", a second series of tests are applied based on the average pixel value. If the results of the tests are all negative, the corresponding pixel value remains set to "off". If any of the results of the tests is positive, the corresponding pixel value is set to "on".

FIG. 9 represents a portion 500 of the second intermediate array, "on" pixel values being represented by shaded squares and "off" pixel values being represented by unshaded squares. The square 510 represents the pixel value that corresponds to the average pixel value calculated from the sub-array 210 of FIG. 8. The squares 512, 514, 516, 518, 520, 522, 524 and 526 correspond to the average pixel values calculated from the sub-arrays 212, 214, 216, 218, 220, 222, 224 and 226 of FIG. 8.

The average values set out in the first array are also subject to the following series of tests.

(a) If the average pixel value is less than or equal to 50%, i.e. 127 for 8-bit image data, would setting the pixel value of the second intermediate array to "on" cause a row of more than 4 horizontally adjacent "on" values or a column of more than 4 vertically adjacent "on" values?

(b) If the average pixel value is greater than 50% and less than or equal to 62.5%, would setting the pixel value of the second intermediate array to "on" cause a row of more than int (4+((average pixel value−50)/12.5)*7) horizontally adjacent "on" values or a column of more than int (4+((average pixel value−50)/12.5)*7) vertically adjacent "on" values?

(c) If the average pixel value is less than or equal to 28.125%, would setting the pixel value of the second intermediate array to "on" cause a chain of 3 horizontally and/or vertically adjacent "on" values?

(d) If the average pixel value is less than or equal to 50%, would setting the pixel value to "on" cause a block of 2*2 horizontally and vertically adjacent "on" values?

(e) If the average pixel value is greater than 50% and less than 56.25%, would setting the pixel value to "on" cause a block of 2*3 or 3*2 horizontally and vertically adjacent "on" values?

(f) If the average pixel value is greater than 56.25% and less than or equal to 62.5%, would setting the pixel value to "on" cause a block of 3*3 or 2*4 or 4*2 horizontally and vertically adjacent "on" values?

(g) If the average pixel value is greater than 62.5% and less than or equal to 68.75%, would setting the pixel value to "on" cause a block of 3*4 or 4*3 or 2*6 or 6*2 horizontally and vertically adjacent "on" values?

(h) If the average pixel value is greater than 68.75% and less than or equal to 75%, would setting the pixel value to "on" cause a block of 4*4 or 3*5 or 5*3 or 2*7 or 7*2 horizontally and vertically adjacent "on" values?

(i) If the average pixel value is greater than 75% and less than or equal to 82.5%, would setting the pixel value to "on" cause a block of 4*5 or 5*4 or 3*7 or 7*3 or 2*10 or 10*2 horizontally and vertically adjacent "on" values?

In this instance, because the average pixel value is the first pixel value of the first intermediate array to be processed, all of the pixel values of the second intermediate array are "off" by default and the results of all of the tests are negative. The pixel value 510 is therefore kept "on".

Had the error diffusion algorithm determined that the corresponding pixel value should remain "off", a corresponding series of tests would have been carried out. The test corresponding to test (a), for example, is "If the average pixel value is greater than or equal to 50%, would setting the pixel value of the second intermediate array to 'off' cause a row of more than 4 horizontally adjacent 'off' values or a column of more than 4 vertically adjacent 'off' values?" The test corresponding to test (i) is "If the average pixel value is less than 25% and greater than or equal to 17.5%, would setting the pixel value to 'off' cause a block of 4*5 or 5*4 or 3*7 or 7*3 or 2*10 or 10*2 horizontally and vertically adjacent 'off' values?"

By setting the pixel value of the second intermediate array to "on", the corresponding average pixel value of 134 of the first intermediate array has effectively been represented by a pixel value of 255, the pixel values of the second array being constrained to be either 0 or 255, which correspond to "off" and "on" respectively. An error value of 255−134=121 is therefore generated and subtracted from the average pixel value of the sub-array 212.

With the exception of portions of the image of which the densities of dots are low, and only then if it was determined in operation 140 that single dots are to be used in portions of the image of which the densities of dots are low, a dot must always form a pair with a horizontally or vertically adjacent dot. This means that a horizontally or vertically adjacent pixel value of the second intermediate array must also be set to "on", so that the image contains a pair of horizontally or vertically adjacent dots. The horizontally or vertically adjacent pixel value is chosen at random. In this instance, the vertically adjacent pixel value 520 is chosen and set to "on".

Processing of the first intermediate array moves to the average pixel value calculated from the sub-array 212. The average pixel value is 141 to the nearest whole number. The result of subtracting the error of 121 diffused from the previous average pixel value from the average pixel value 141 is 20. As this is less than 127, the error diffusion algorithm determines that the pixel value 512 of the second intermediate array should remain "off".

The results of the corresponding series of tests are all negative so the pixel value 512 remains "off". Again, with the exception of portions of the image of which the densities of dots are high, and only then if it was determined in operation 140 that single dots are to be used in portions of the image of which the densities of dots are low, and that also therefore single non-dots are to be used in portions of the image of which the densities of dots are high, a non-dot must always form a pair with a horizontally or vertically adjacent non-dot. This means that a pixel value horizontally or vertically adjacent to the pixel value 512 must also remain "off". In this instance the horizontally adjacent pixel value 514 is chosen.

By maintaining the pixel value 512 "off", the result of the corresponding average pixel value less the error diffused from the previous pixel value, that is 20, has effectively been represented by a pixel value of 0. An error value of 0−20=−20 is therefore generated and subtracted from the average pixel value of the sub-array 214.

Processing of the first intermediate array moves to the average pixel value calculated from the sub-array 214. The average pixel value is 137 to the nearest whole number. The result of subtracting the error of −20 diffused from the previous average pixel value from the average pixel value 137 is 157. Although this is greater than 127, the pixel value 514 has already been determined to remain "off", so as to form a pair with the "off" pixel value 512. An error value of 0−157=−157 is therefore generated and subtracted from the average pixel value of the sub-array 516.

Processing moves to the average pixel value calculated from the sub-array 216. The average pixel value is 139 to the nearest whole number. The result of subtracting the error of −157 diffused from the previous average pixel value from the average pixel value 139 is 296. As this is greater than 127, the error diffusion algorithm determines that the pixel value 516 of the second intermediate array should be set to "on".

The results of the series of tests are all negative so the pixel value 516 is set to "on". The horizontally adjacent pixel value 518 is chosen as the adjacent pixel that is to be set to "on" so that the pixel values 516 and 518 form a pair. An error value of 255−296=−41 is generated and subtracted from the average pixel value of the sub-array 218.

Processing moves to the average pixel value calculated from the sub-array 218. The average pixel value is 143. The result of subtracting the error of −41 diffused from the previous average pixel value from the average pixel value 143 is 184. As the pixel value 518 has already been determined to be set to "on", the tests are not carried out and an error value of 255−184=71 is generated and subtracted from the average pixel value of the sub-array 220.

Processing moves to the average pixel value calculated from the sub-array 220. The average pixel value is 137 to the nearest whole number. The result of subtracting the error of 71 diffused from the previous average pixel value from the average pixel value 137 is 66. Although this is less than 127, the pixel value 520 has already been set to "on", so as to form a pair with the pixel value 510. An error value of 255−66=189 is therefore generated and subtracted from the average pixel value of the sub-array 222.

Processing moves to the average pixel value calculated from the sub-array 222. The average pixel value is 127 to the nearest whole number. The result of subtracting the error of 189 diffused from the previous average pixel value from the average pixel value 127 is −62. As this is less than 127, the error diffusion algorithm determines that the pixel value 522 should remain "off".

The results of the corresponding series of tests are all negative so the pixel value 522 remains "off". The horizontally adjacent pixel value 524 is chosen as the adjacent pixel that is to remain "off" so that the pixel values 522 and 524 form a pair. An error value of 0−(−62)=62 is generated and subtracted from the average pixel value of the sub-array 224.

Processing moves to the average pixel value calculated from the sub-array 224. The average pixel value is 133 to the nearest whole number. The result of subtracting the error of 62 diffused from the previous average pixel value from the pixel value 133 is 71. As the pixel value 524 has already been determined to remain "off", the tests are not carried out and an error value of 0−71=−71 is generated and subtracted from the average pixel value of the sub-array 226.

Processing moves to the average pixel value calculated from the sub-array 226. The average pixel value is 131 to the nearest whole number. The result of subtracting the error of −71 diffused from the previous average pixel value from the pixel value 131 is 202. As this is greater than 127, the error diffusion algorithm determines that the pixel value 526 should be set to "on".

The series of tests set out above is carried out, the results all being negative. The pixel value 526 is therefore set to "on". There is no need to set a horizontally or vertically adjacent pixel value to "on" because the pixel value 516 is vertically adjacent to the pixel value 526 and is set to "on", so that the pixel values 516 and 526 form a pair.

As can be seen from this simple example, the specimen multiple-bit image data of FIG. 8 have an average value of 136 to the nearest whole number. This corresponds to approximately 53%, the maximum possible value of the multiple-bit data being 255. Accordingly, five of the nine pixel values of the second intermediate array that correspond to the nine average pixel values of the first intermediate array calculated from the nine sub-arrays shown in FIG. 8 are "on". It is to be noted that the operation of a computer program according to the present disclosure is such that, as shown in FIG. 9, isolated pairs of diagonally adjacent "on" pixel values do not occur, pairs of diagonally adjacent "on" pixel values such as 510 and 518, and 518 and 526, either forming a triplet with a third "on" pixel value such as 520 or 516, or forming a quadruplet, each of the pair of diagonally adjacent "on" pixel values forming a pair with a (shared) horizontally or vertically adjacent "on" pixel value.

This screening process is substantially as described in PCT International Application Publication No. WO 2011/030102 and U.S. Patent Application Publication No. 2012/0218607, the contents of which are hereby incorporated by reference.

The second intermediate array shown at FIG. 9 is one of two such arrays, each for a respective colour of dot. Each of the squares in the Figure corresponds to a respective possible site for a dot, the shaded squares denoting sites to be occupied by the corresponding dots.

For the cyan dots, the second intermediate array is of a size 800×1200 elements per square inch, whilst the size of the second array for magenta dots is 1200×800 elements per square inch, so that when each element is used to instruct the marking of a respective possible site, the original 2400×2400 scale is preserved in the final image.

The process will also apply yellow dots to the substrate to give a CMYK colour image, but the process of screening the data for the yellow dots and the selection of the dimensions of those dots and their possible sites can be in accordance with conventional FM screening techniques since yellow is a relatively light colour and the variations (if any) in interleaving and overlap of the yellow dots with the other dots will not significantly impair image quality.

Figure 10:
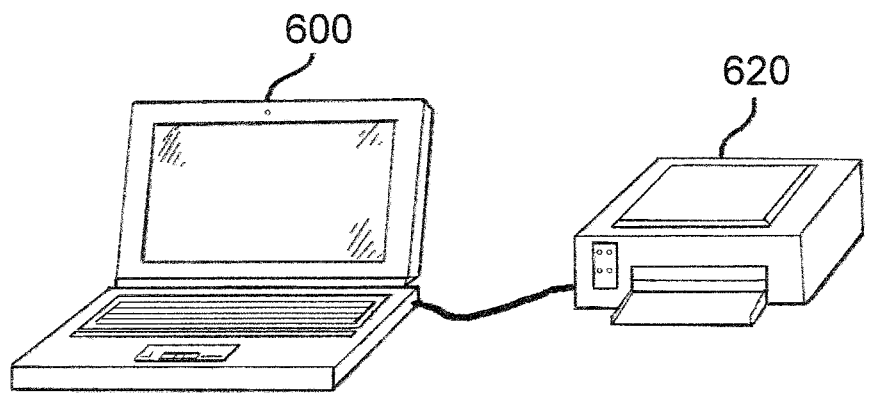
FIG. 10 is a schematic representation of a printing apparatus in accordance with the present disclosure.

FIG. 10 shows printing apparatus comprising a computer 600 loaded with a program for performing a screening process according to the present disclosure, and a printer such as a CTP printer 620 for printing the resultant 1-bit image data onto a suitable carrier.

The disclosure set forth above encompasses multiple distinct inventions with independent utility. While each of these inventions has been disclosed in its preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods, and/or steps disclosed herein. Similarly, where any disclosure above or claim below recites "a" or "a first" element, step of a method, or the equivalent thereof, such disclosure or claim should be understood to include incorporation of one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in other combinations and subcombinations of features, functions, elements, properties, methods, and/or steps may be claimed through amendment of the present claims or presentation of new claims in this or a related application. Such amended or new claims, whether they are directed to a different invention or directed to the same invention, whether different, broader, narrower, or equal in scope to the original claims, also are regarded as within the subject matter of the inventions of the present disclosure.

The invention claimed is:

1. A method of printing a colour image having more than one colour and derived from multiple-bit image data, the method comprising the steps of:
    (a) receiving multiple-bit image data comprising multiple-bit pixel values;
    (b) deriving from said multiple-bit pixel values 1-bit image data comprising a first set and a second set of 1-bit image data comprising "on" and "off" pixel values, each set corresponding to a respective component colour of the colour image; and
    (c) printing from the 1-bit image data the colour image comprising corresponding first and second sets of dots, the dots of each set being of a respective one of the component colours, each of all of the dots of one of the colours of dots being constrained to be within a respective site selected from a first set of predetermined possible sites, and each of all of the dots of the other colour of dots being constrained to be within a respective site selected from a second set of predetermined possible sites, wherein the possible sites of the first and second sets of possible sites overlap so that individual dots of one colour of dots can overlap dots of the other colour of dots, and wherein the possible sites of one set are of different dimensions from the sites of the other set so that individual dots of one colour cannot fully cover individual dots of the other colour, wherein the possible sites have the same shape and size, the possible sites having different dimensions by virtue of the sites of the first set of possible sites having a different orientation from the sites of the second set of possible sites.

2. The method of claim 1, in which each set of the first and second sets of possible sites is tessellated, and wherein the first and second sets of possible sites cover the same area of the image.

3. The method of claim 1, wherein the possible sites of the first set of possible sites are all of the same shape and dimensions as each other, and the possible sites of the second set of possible sites are also all of the same shape and dimensions as each other.

4. The method of claim 3, in which all the possible sites of the first set of possible sites are each of a size of M1×N1 pixels, whilst all of those of the second set of possible sites are of a size M2×N2 pixels, wherein M1 does not equal M2 and N1 does not equal N2.

5. The method of claim 4, in which each possible site of the first set of possible sites is two units high by three units wide (2×3), whilst each possible site of the second set of possible sites is three units high by two units wide (3×2).

6. The method of claim 5, in which each unit corresponds to a respective pixel in the colour image so that the sites of the first set of possible sites are each defined by two rows and three columns of pixels, the possible sites of the second set of possible sites each being defined by three rows and two columns of pixels.

7. The method of claim 3, in which a width of each site in the first set of possible sites is not a multiple or a factor of a width of each site in the second set of possible sites.

8. The method of claim 3, in which none of the individual possible sites of the first set of possible sites fully covers any one of the individual possible sites of the second set of possible sites, and vice versa.

9. The method of claim 1, in which each dot of the first and second sets of dots is coextensive with its respective site, so that each dot has the same size, shape, and orientation as its respective site.

10. The method of claim 1, in which each dot of the first and second sets of dots is smaller than its respective site, each dot of a given set of the first and second sets of dots being constrained to be within its respective site, the dots being so arranged that a significant number of individual dots from the first set cannot completely cover individual dots from the second set.

11. The method of claim 10, in which the dots of the first and second sets of dots occupy corresponding portions of their respective sites.

12. The method of claim 11, in which the dots of the first and second sets of dots are reduced from a full size of 3×2 and 2×3 units by omitting a first row of all of the 3×2 dots and a first column of all of the 2×3 dots.

13. The method of claim 1, in which pixel data for the first set of dots is associated with possible sites of 2×3 units in size and is for one of the cyan component or the magenta component of the colour image, and in which pixel data for the second set of dots is associated with possible sites of 3×2 units in size and is for the other of the cyan component or the magenta component of the colour image.

14. The method of claim 13, in which the 1-bit image data includes data for a third set of dots, and associated possible sites, corresponding to a black component, the size of each site of the third set being 4×4 units.

15. The method of claim 1, in which a height of each site in one of the first and second sets of possible sites is not a multiple or a factor of a height of each site in the other of the first and second sets of possible sites.

16. The method of claim 1, in which a width of each site of all of the first set of possible sites is not a multiple or a factor of a width of each site in all of the second set of possible sites, and wherein a height of each site in all of one of the first and second sets of possible sites is not a multiple or a factor of a height of each site in all of the other of the first and second sets of possible sites.

17. The method of claim 1, wherein the step (b) comprises a stochastic screening method.

18. A printing apparatus programmed or configured to perform the method of claim 1 to print the colour image.

19. A method of generating 1-bit image data for a colour image having more than one colour, the 1-bit image data comprising at least two sets of pixel values, each set corresponding to a respective component colour of the colour image, the method comprising the steps of:
(a) receiving multiple-bit image data comprising multiple-bit pixel values; and
(b) using electronic data processing apparatus, electronically deriving from said multiple-bit pixel values a first set and a second set of 1-bit image data comprising "on" and "off" pixel values which produce when printed a first and second set of dots, the dots of each set being of a respective one of the component colours, each of all of the dots of one of the colours of dots being constrained to be within a respective site selected from a first set of predetermined possible sites, and each of all of the dots of the other colour of dots being constrained to be within a respective site selected from a second set of predetermined possible sites, wherein the possible sites of the first and second sets of possible sites overlap so that individual dots of one colour of dots can overlap dots of the other colour of dots, and wherein the possible sites of one set are of different dimensions from the sites of the other set so that individual dots of one colour cannot fully cover individual dots of the other colour, wherein the possible sites have the same shape and size, the possible sites having different dimensions by virtue of the sites of the first set of possible sites having a different orientation from the sites of the second set of possible sites.

20. Electronic data processing apparatus programmed or arranged to perform the method of claim 19.

* * * * *